(No Model.)

P. C. LEWIS.
CALK COVERER.

No. 303,650. Patented Aug. 19, 1884.

WITNESSES:
George N. Sonneborn
George F. Whitlock.

INVENTOR
Peail C. Lewis
BY G. Harding
ATTORNEY

UNITED STATES PATENT OFFICE.

PEARL C. LEWIS, OF CATSKILL, NEW YORK.

CALK-COVERER.

SPECIFICATION forming part of Letters Patent No. 303,650, dated August 19, 1884.

Application filed February 29, 1884. (No model.)

*To all whom it may concern:*

Be it known that I, PEARL C. LEWIS, of the town of Catskill, county of Greene, and State of New York, and a citizen of the United States, have invented a new and useful Improvement in Calking-Boots or Calk-Coverers, of which the following is a true and exact specification, reference being had to the accompanying drawings, which form part of the same.

My invention relates to a device for preventing horses from calking and for other purposes.

The chief object of my invention is to furnish a device for preventing horses calking. The strain on the back tendons causes the horse to make an effort to release himself of such strain. This is done by elevating one hind foot and placing it upon the foot on which he stands. When the calks begin to cut or hurt, instead of lifting the foot so as to remove the pressure of the calk they undertake to remove the foot upon which the calk rests, and in this effort the horse is cut, and in many cases very severely. Heretofore it has been the custom to place a curved projecting leather piece around the rear leg of the horse.

My improvement has for its object the raising or elevating of the calk of the shoe of the horse, which causes the strain on the back tendon to be relieved; also, that by covering the calk for the above purpose I protect the sharpness of the calk from doing any injury or becoming dulled while standing in the stable. I also find that by using this elevating device a relief, if not a cure, is obtained for what is known as "cocked ankles" and "knee-sprung horses." I accomplish this elevation and covering of the calk of the shoe by using a hollow metallic substance of more or less thickness, which covers the calk and raises it from the ground.

Figure 1:
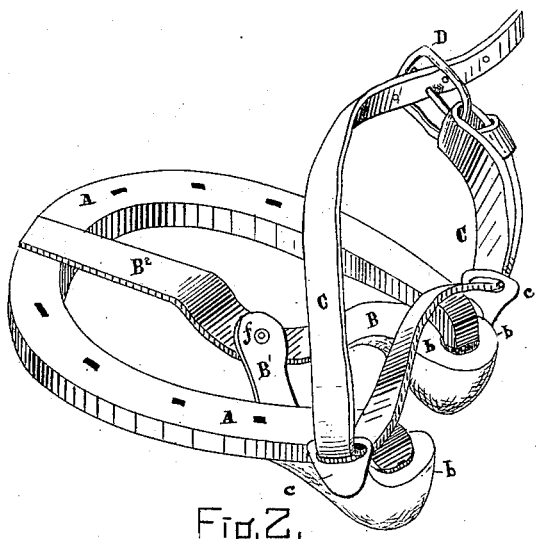
Figure 2:
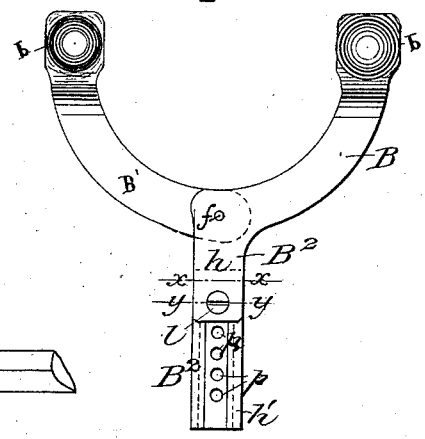
Figure 3:
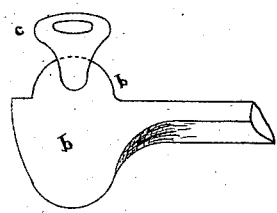
Figure 4:
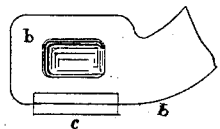
Figure 6:
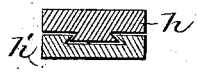
Figure 5:
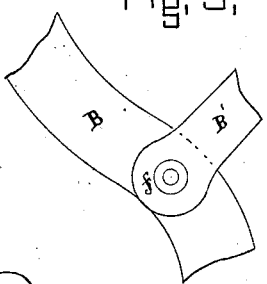
Figure 7:

In the accompanying drawings, Figure 1 represents a perspective view of my invention, together with one method of fastening said calk coverers or bulbs securely. Fig. 2 represents a view of the plates and bulbs. Figs. 3 and 4 are differents views of the bulb, and Fig. 5 represents the plates especially in reference to the rivet $f$. Fig. 6 is a cross-section on the line $x$ $x$, and Fig. 7 is a cross-section on the line $y$ $y$ of Fig. 2.

A A represent a horseshoe.

$b$ $b$ are the hollow bulbs at heels, which receive the calks of the horse's shoe. The bulb-sockets in general, although not necessarily so, should be deep enough to prevent the calks reaching the bottom and dulling them. In the device shown in this figure two castings are made, B $B^2$ $b$, and another, B' $b$, riveted together at $f$, so that the two arms B $b$ B' $b$ may be extended or contracted to the width of any shoe.

$B^2$ $f$ is a continuation beyond the riveted junction, so as to project under the forward part of the shoe and keep the bulb in position. This may be either rigid and filed off to fit the length of the shoe, or may be so constructed that the distance may be lengthened or shortened by making it, $B^2$, of two pieces, one containing a dovetailed groove and the other a dovetailed flange. The dovetailed flange slides in the groove, and this may be extended beyond or shortened to the length of the arm $B^2$. The arms may be made rigid by a machine-screw or any other well-known method.

$B^2$ $B^2$ represent the extensible arm, as shown in Fig. 1; $l$, the machine-screw.

$h'$ represents the dovetailed groove in the extension-arm; $h$, the dovetailed flange in the upper arm, $B^2$; $d$ $p$, holes drilled in lower arm.

I do not intend limiting myself to this method of lengthening and shortening, as it may be done by any other well-known method.

$c$ $c$ are two slotted ears riveted upon the arms before described. Through these ears passes a strap, C, one part passing around the rear of the horse's foot, the other passing over the front of the hoof or above it, and fastened by a buckle, D.

I do not intend to limit myself only to this device shown to fix the bulbs in secure position, as it may be done in a number of different ways, either by attaching them by thumb-screws either in combination with straps or not, or by a spring and pivot. They may be also attached by clamps over or under the heels of the shoes. I however prefer the construction shown in Fig. 1.

What I claim as new, and desire to secure by Letters Patent, is as follows:

1. A calking-boot or calk-coverer consisting of a hollow socket or bulb, substantially as and for the purposes described.

2. A calking-boot or calk-coverer consisting of a hollow socket or bulb, $b$, in combination with jointed arms or plates B and B', substantially as and for the purposes described.

3. A calking-boot or calk-coverer consisting of a hollow socket or bulb, $b$, and the jointed arms B B', in combination with the straight arm or plate $B^2$, substantially as and for the purposes described.

4. A calking-boot or calk-coverer consisting of a hollow socket or bulb, with jointed arms or plates B and B' in combination with the arm or plate $B^2$, said arm $B^2$ being so arranged that it can be extended or shortened as desired, substantially as and for the purpose described.

5. A calking-boot or calk-coverer consisting of a hollow socket or bulb, two jointed arms or plates, B B', arm or plate $B^2$, said arm or plate $B^2$ being constructed rigid, or in such a manner that it can be extended or shortened as desired, in combination with the slotted ears $c$ and strap C, substantially as and for the purposes described.

In witness whereof I have hereunto set my hand.

PEARL C. LEWIS.

Witnesses:
P. CONOVER,
FRANK H. OSBORN.